US009725347B2

(12) United States Patent
Lee et al.

(10) Patent No.: US 9,725,347 B2
(45) Date of Patent: Aug. 8, 2017

(54) WATER TREATMENT APPARATUS (71) Applicant: COWAY CO., LTD., Chungcheongnam-do (KR)

(72) Inventors: Jun-Young Lee, Seoul (KR); Doo-Won Han, Seoul (KR); Hyun-Chul Lee, Seoul (KR); Geun-Sang Ryu, Seoul (KR); Sung-Han Yun, Seoul (KR); Soon-Ho Lim, Seoul (KR); Seo-Young Kim, Seoul (KR)

(73) Assignee: Coway Co., Ltd. (KR)

( * ) Notice: Subject to any disclaimer, the term of this patent is extended or adjusted under 35 U.S.C. 154(b) by 77 days.

(21) Appl. No.: 14/649,453

(22) PCT Filed: Nov. 4, 2013

(86) PCT No.: PCT/KR2013/009906
§ 371 (c)(1),
(2) Date: Jun. 3, 2015

(87) PCT Pub. No.: WO2014/088212
PCT Pub. Date: Jun. 12, 2014

(65) Prior Publication Data
US 2016/0200612 A1 Jul. 14, 2016

(30) Foreign Application Priority Data

Dec. 4, 2012 (KR) .................. 10-2012-0139869

(51) Int. Cl.
*C02F 9/00* (2006.01)
*C02F 1/28* (2006.01)
(Continued)

(52) U.S. Cl.
CPC .............. *C02F 9/00* (2013.01); *B01D 15/08* (2013.01); *B01D 15/361* (2013.01); *C02F 9/005* (2013.01);
(Continued)

(58) Field of Classification Search
CPC .... C02F 1/42; C02F 1/283; C02F 5/04; C02F 9/00; C02F 9/05; C02F 2201/005;
(Continued)

(56) References Cited

U.S. PATENT DOCUMENTS 5,653,871 A * 8/1997 Thomsen ............... B01D 27/08
210/232
5,795,471 A * 8/1998 Naito ...................... B01J 47/024
210/223

(Continued)

FOREIGN PATENT DOCUMENTS

CN 2194906 4/1995
EP 1 118 368 7/2001
(Continued)

OTHER PUBLICATIONS

Chinese Office Action dated May 18, 2016 issued in counterpart application No. 201380063409.1, 8 pages.
(Continued)

*Primary Examiner* — Matthew O Savage
(74) *Attorney, Agent, or Firm* — The Farrell Law Firm, P.C.

(57) ABSTRACT

Disclosed is a water treatment apparatus that includes a head including an inlet portion into which water flows, an outlet portion from which water is discharged externally, and a connection portion connected to the inlet portion and the outlet portion, and a water treatment unit connected to the connection portion, including a plurality of water treatment sections, coupled to the head, and configured such that a portion of the water flowing into the inlet portion passes through the plurality of water treatment sections and sequentially, the remainder of the water passes through only a portion of the plurality of water treatment sections and, and the water flows to the outlet portion together.

12 Claims, 9 Drawing Sheets (51) Int. Cl.
*C02F 1/42* (2006.01)
*B01D 15/08* (2006.01)
*B01D 15/36* (2006.01)
*B01D 27/14* (2006.01)
*B01D 24/00* (2006.01)
*C02F 5/04* (2006.01)
*C02F 1/44* (2006.01)

(52) U.S. Cl.
CPC .......... *B01D 24/008* (2013.01); *B01D 27/148* (2013.01); *B01D 2201/303* (2013.01); *C02F 1/283* (2013.01); *C02F 1/42* (2013.01); *C02F 1/44* (2013.01); *C02F 5/04* (2013.01); *C02F 2201/005* (2013.01); *C02F 2301/043* (2013.01)

(58) Field of Classification Search
CPC ............ C02F 2301/043; B01D 24/007; B01D 24/008; B01D 27/146; B01D 27/148; B01D 2201/303; B01D 2201/4076; B01D 2201/4015
USPC ................. 210/232, 249, 254, 283, 288, 429
See application file for complete search history.

(56) References Cited

U.S. PATENT DOCUMENTS

| | | |
|---|---|---|
| 5,830,371 A | 11/1998 | Smith et al. |
| 6,274,038 B1 | 8/2001 | Reid |
| 2002/0134725 A1 | 9/2002 | Smith et al. |
| 2003/0196948 A1 | 10/2003 | Bassett et al. |
| 2008/0023402 A1 | 1/2008 | Rawson et al. |
| 2008/0053879 A1 | 3/2008 | Harris |
| 2009/0173675 A1 | 7/2009 | Scholz et al. |
| 2010/0326898 A1* | 12/2010 | Scholz ...................... C02F 1/42 210/232 |

FOREIGN PATENT DOCUMENTS

| | | |
|---|---|---|
| GB | 1 604 833 | 12/1981 |
| WO | WO 2008/027347 | 3/2008 |

OTHER PUBLICATIONS

European Search Report dated Sep. 24, 2015 issued in counterpart application No. 13859852.9-1351, 5 pages.

* cited by examiner

- - - - → WATER

--------→ WATER

---→ WATER

[Figure 9]

WATER TREATMENT APPARATUS

PRIORITY

This application is a National Phase Entry of PCT International Application No. PCT/KR2013/009906, which was filed on Nov. 4, 2013, and claims priority to Korean Patent Application No. 10-2012-0139869, which was filed on Dec. 4, 2012, the contents of each of which are incorporated herein by reference.

TECHNICAL FIELD

The present disclosure relates to a water treatment apparatus discharging water externally after treating inflow water, and more particularly, to a water treatment apparatus having a plurality of water treatment sections so that after a portion of the water passes through the plurality of water treatment sections sequentially and the remainder of the water passes through only a portion of the plurality of water treatment sections, the water is discharged together externally.

BACKGROUND ART

A water treatment apparatus is an apparatus discharging water externally after treating inflow water. A common example of such an apparatus is a water filter, which filters inflow water and discharges filtered water.

In addition, in addition to such a water filter, there are water treatment apparatuses designed to dissolve functional substances such as phosphates or the like preventing the occurrence of pipeline scale in inflow water. Also, there are provided water treatment apparatuses having an ion-exchange resin which relatively increases positive or negative ions in inflow water according to the type of ion-exchange resin.

Such water treatment apparatuses include water treatment sections for the aforementioned water treatment. However, a water treatment apparatus according to the related art is limited to being provided with a water treatment section which performs to a single type of treatment.

Therefore, a water treatment apparatus according to the related art is limited to performing only one of three functions: filtering water, dissolving functional substances or increasing an amount of positive or negative ions in water.

In addition, in dissolving functional substances such as phosphates or the like or increasing positive or negative ions, adequate amounts of functional substances or positive or negative ions should be controlled to be dissolved or be relatively increased according to the flow rate of inflow water. However, such control cannot be easily carried out.

DISCLOSURE

Technical Problem

The present disclosure is provided to resolve a problem as described above, occurring in an apparatus according to the related art.

An aspect of the present disclosure provides a water treatment apparatus including a plurality of water treatment sections to treat inflow water.

An aspect of the present disclosure also provides a water treatment apparatus in which inflow water is treated by allowing a portion of the water to pass through a plurality of water treatment sections sequentially, allowing the remainder of the water to pass through only a portion of the plurality of water treatment sections, and finally discharging the water together externally.

An aspect of the present disclosure also provides a water treatment apparatus adjusting the flow rate of water that passes through a portion of the water treatment sections.

An aspect of the present disclosure provides a water treatment apparatus allowing an adequate amount of functional substances to be dissolved in inflow water or an amount of positive ions or negative ions to be relatively increased.

Technical Solution

According to an aspect of the present disclosure, a water treatment apparatus is provided.

The present disclosure is provided, based on a configuration in which a plurality of water treatment sections are included, a portion of inflow water passes through the plurality of water treatment sections sequentially, the remainder of the water passes through only a portion of the plurality of water treatment sections, and the water is discharged together externally.

According to an aspect of the present disclosure, a water treatment apparatus may include: a head including an inlet portion into which water flows, an outlet portion from which water is discharged externally, and a connection portion connected to the inlet portion and the outlet portion; and a water treatment unit connected to the connection portion, including a plurality of water treatment sections, coupled to the head, and configured such that a portion of the water flowing into the inlet portion passes through the plurality of water treatment sections sequentially, the remainder of the water passes through only a portion of the plurality of water treatment sections, and the water flows to the outlet portion together.

The head may include: a head unit including the inlet portion, the outlet portion, and the connection portion; and a flow guide portion guiding the water flowing into the inlet portion to flow into the water treatment unit, and guiding the water treated by the water treatment unit to flow into the outlet portion.

The flow guide portion may include a passage forming member including an inflow passage having an open lower portion connected to an inflow portion included in the water treatment unit and connected to the inlet portion, and an outflow passage connected to the outlet portion and the connection portion; and an opening/closing member rotatably provided on the passage forming member and including a plurality of opening/closing apertures formed therein to open or close a plurality of first inflow apertures or a plurality of second inflow apertures formed in the inflow portion according to a rotating location of the opening/closing member.

The plurality of first inflow apertures and the plurality of second inflow apertures may be spaced apart from each other by a predetermined interval, and may be formed in a circumference of a virtual circle on the inflow portion and have diameters of which the sizes are decreased in a single direction. The plurality of opening/closing apertures may have slots with different lengths, may be spaced apart from each other by a predetermined interval, and may be formed in the opening/closing member in locations corresponding to locations of the plurality of first inflow apertures and the plurality of second inflow apertures.

The flow guide portion may further include a connection member connected to the opening/closing member to block an open upper portion of the passage forming member; and a gripping member connected to the connection member.

The opening/closing member and the connection member may have an elastic member provided therebetween.

The connection portion may be connected to an auxiliary connection member supporting the connection of the water treatment unit to the connection portion, and the auxiliary connection member may include a locking release member locking or unlocking the connection of the water treatment unit.

The auxiliary connection member may be connected to a bracket.

The water treatment unit may include an inlet/outlet member having an inflow portion into which water flows from the head and an outflow portion through which water is discharged to the head; and a housing connected to the inlet/outlet member, including a first water treatment section and a second water treatment section, and configured such that a portion of the water flowing into the inflow portion passes through the first and second water treatment sections sequentially, the remainder of the water passes through only the second water treatment section, and the water flows together to the outflow portion.

The second water treatment section may be located above the first water treatment section, a portion of the water flowing into the inflow portion may flow into a lower portion of the housing and then may pass through the first and second water treatment sections sequentially, and the remainder of the water may pass through only the second water treatment section.

The first water treatment section may include a functional substance or an ion-exchange resin, and the second water treatment section may include carbon particles.

The inflow portion may include a plurality of first inflow apertures and a plurality of second inflow apertures, and the outflow portion may include a plurality of outflow apertures.

The housing may further include a first guide member including a first passage connected to the plurality of first inflow apertures so that water passing through the plurality of first inflow apertures flows into the first passage; a second guide member including a second passage connected to the first passage so that water passing through the first passage flows into a lower portion; and a third guide member into which the second guide member is inserted so that a bypass passage is formed therebetween, the bypass passage being connected to the second water treatment section and the plurality of second inflow apertures so that water passing through the plurality of the second inflow apertures flows into the second water treatment section.

The housing may further include a fourth guide member including a third passage connected to the second passage so that water passing through the second passage flows into the lower portion.

The housing may have one or more partitioning members formed of a water permeable material partitioning the first and second water treatment sections.

The partitioning members may be formed of non-woven fabric.

Advantageous Effects

As set forth above, according to exemplary embodiments in the present disclosure, the water treatment apparatus may include a plurality of water treatment sections treating inflow water.

In addition, according to the exemplary embodiments in the present disclosure, a portion of inflow water is treated by passing through a plurality of water treatment sections sequentially, the remainder of the water is treated by passing through only a portion of the plurality of water treatment sections, and then, the water is discharged together externally.

Also, the water treatment apparatus according to the exemplary embodiments in the present disclosure is capable of adjusting the flow rate of water passing through a portion of the water treatment sections.

Furthermore, the water treatment apparatus according to the exemplary embodiments in the present disclosure may be provided in which adequate amounts of functional substances are dissolved in the inflow water and an amount of positive or negatives ions is relatively increased.

MODE FOR INVENTION

Hereinafter, embodiments in the present disclosure will be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Exemplary embodiments in the present disclosure are based on a configuration in which a plurality of water treatment sections are provided, and after a portion of inflow water passes through the plurality of water treatment sections sequentially and the remainder of the water passes through only a portion of the plurality of water treatment sections, the water is discharged together externally.

With reference to FIGS. 1 to 4, the water treatment apparatus 100 according to an embodiment in the present disclosure may be configured to include a head 200 and a water treatment unit 300.

Figure 1:
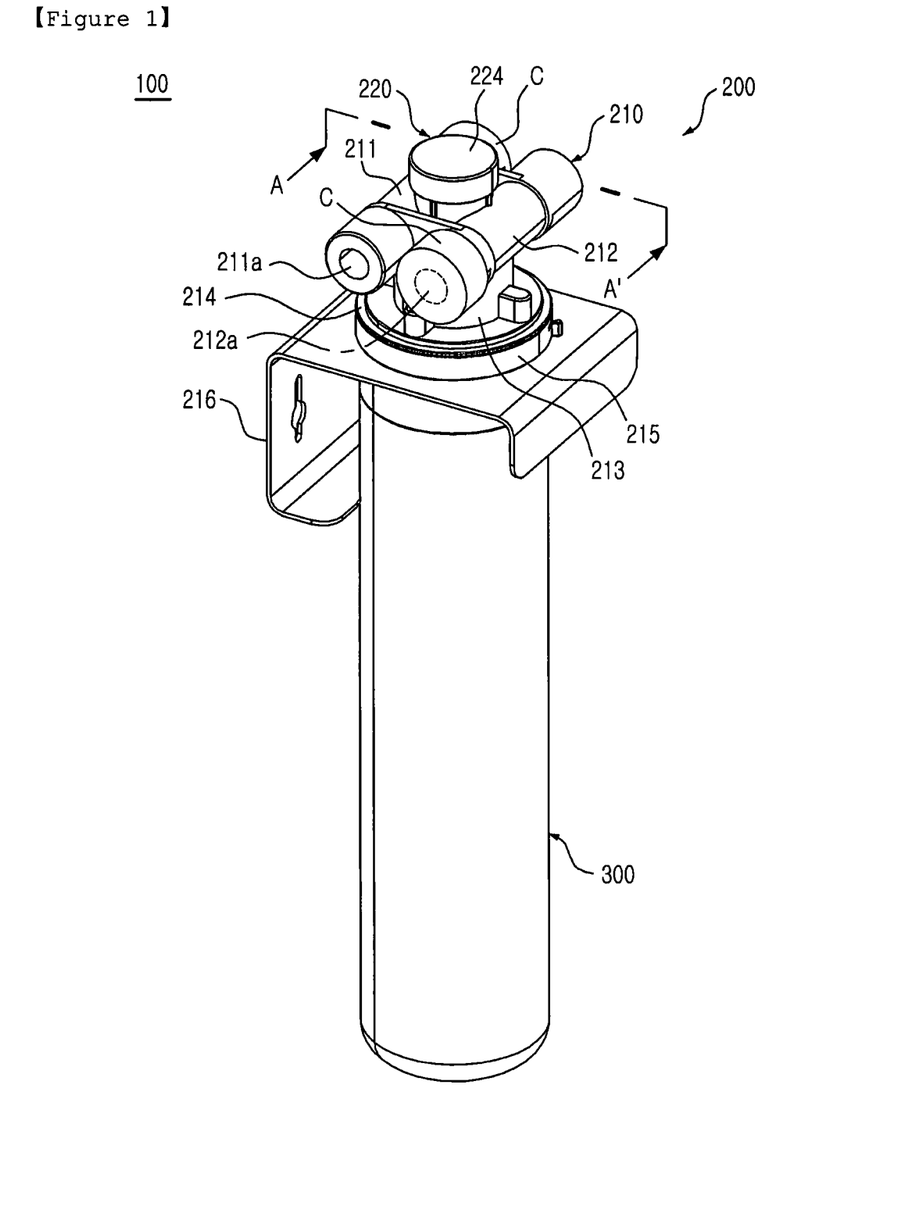
FIG. 1 is a perspective view of a water treatment apparatus according to an exemplary embodiment in the present disclosure.
Figure 2:
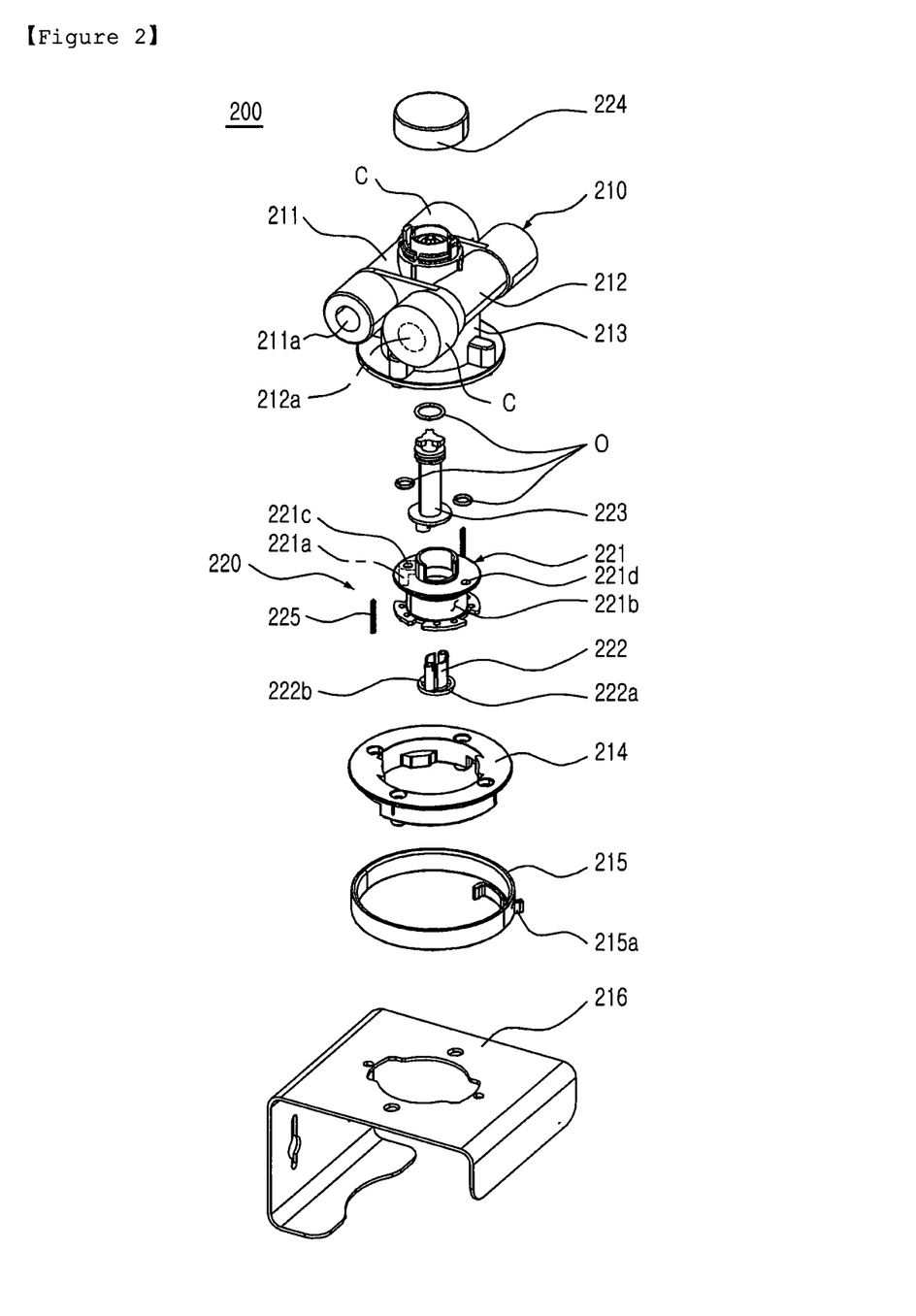
FIG. 2 is an exploded perspective view of a head of a water treatment apparatus according to an exemplary embodiment in the present disclosure.
Figure 4:
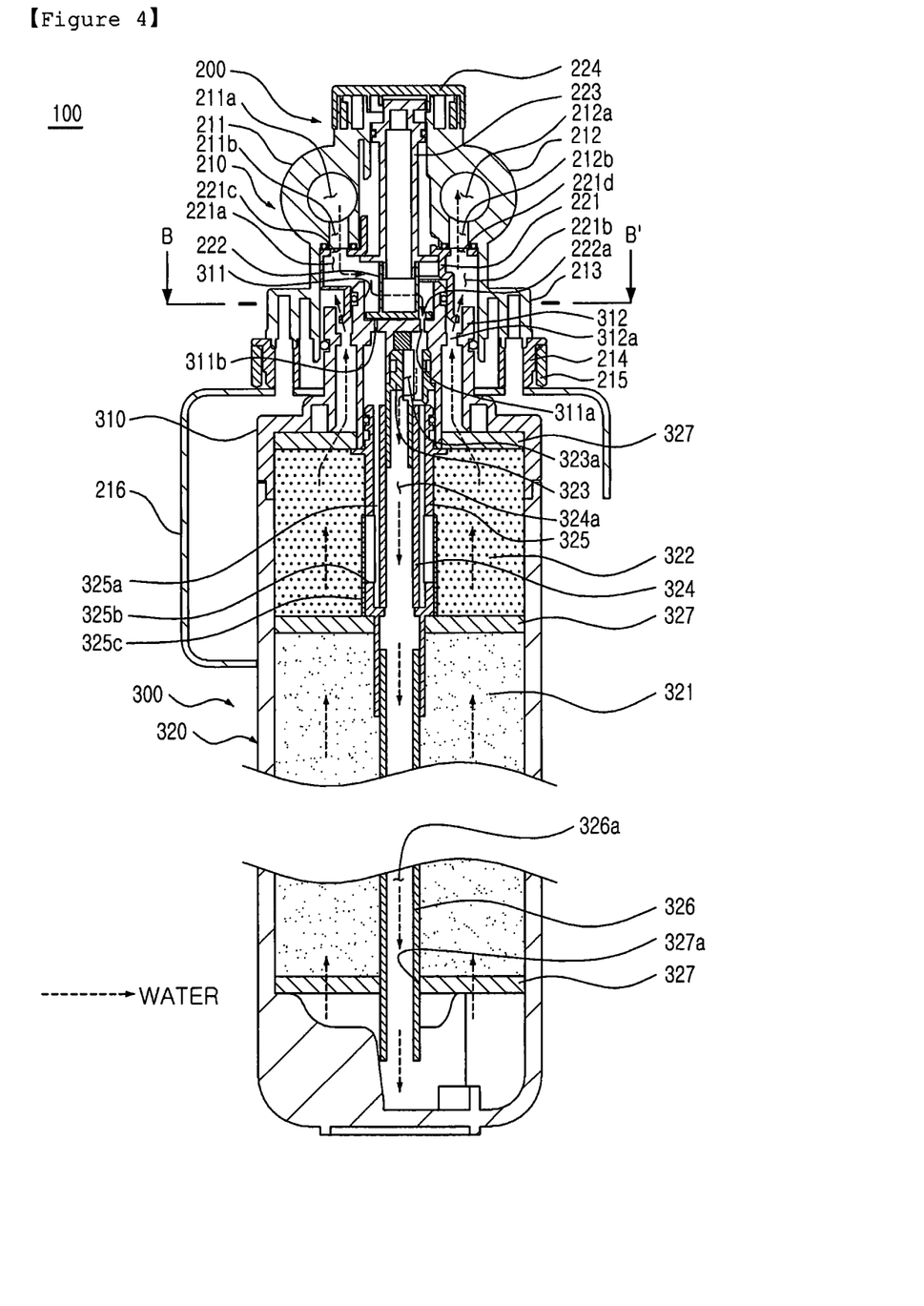
FIG. 4 is a cross-sectional view taken along line A-A' of FIG. 1, illustrating an operation of the water treatment apparatus according to an exemplary embodiment in the present disclosure, which illustrates that all of the water flowing into the head passes through the first and second water treatment portions sequentially.

With reference to FIGS. 1, 2, and 4, the head 200 according to the exemplary embodiment in the present disclosure may include a head unit 210 and a flow guide portion 220. In addition, with reference to the exemplary embodiment, the head unit 210 may include an inlet portion 211, an outlet portion 212, and a connection portion 213.

Figure 6:
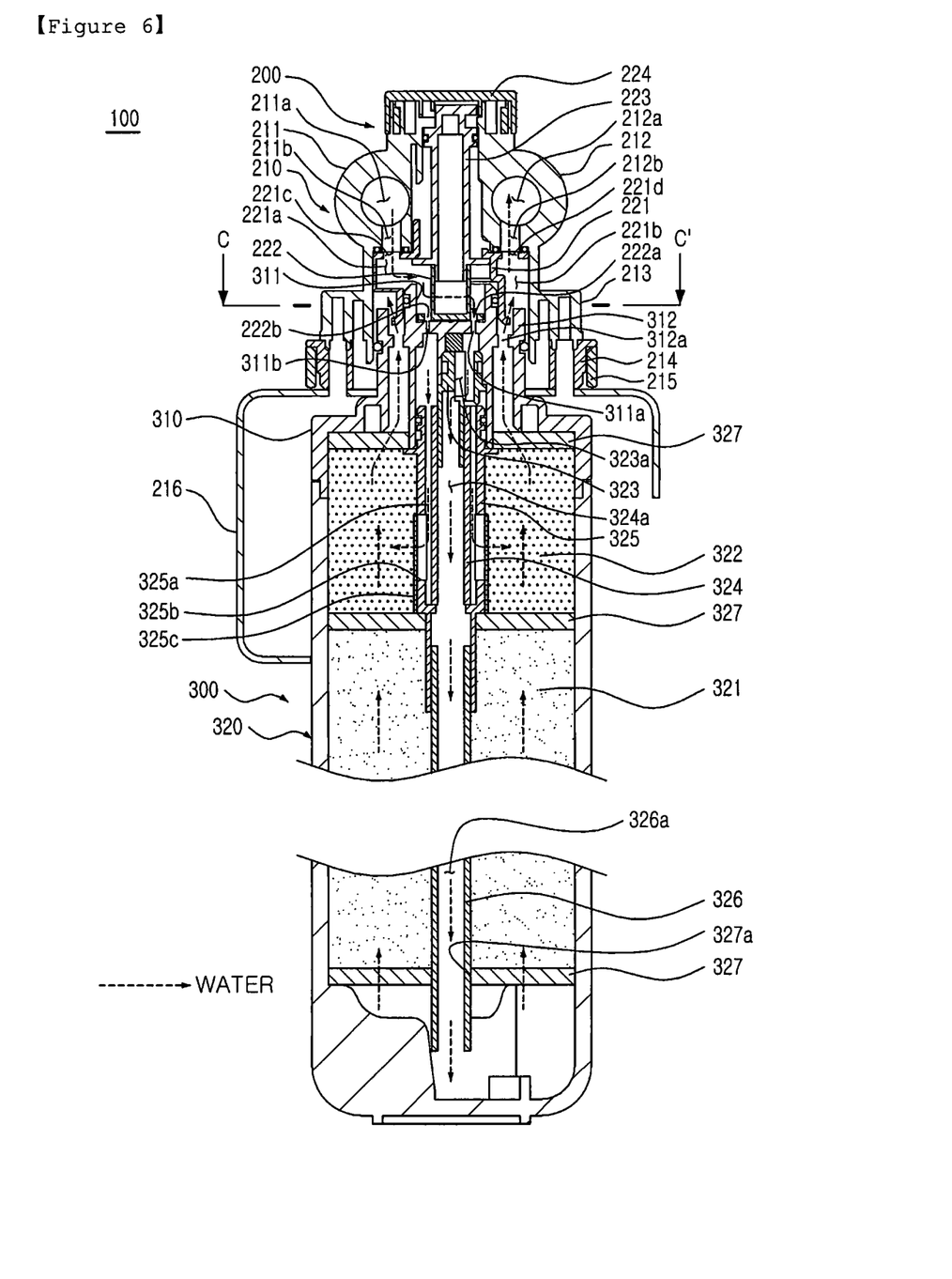
FIG. 6 is a cross-sectional view taken along line A-A' of FIG. 1 illustrating an operation according to an exemplary embodiment in the present disclosure, which illustrates a portion of the inflow water passing through first and second water treatment sections sequentially and the remainder of the water passing through only the second water treatment section.
Figure 8:
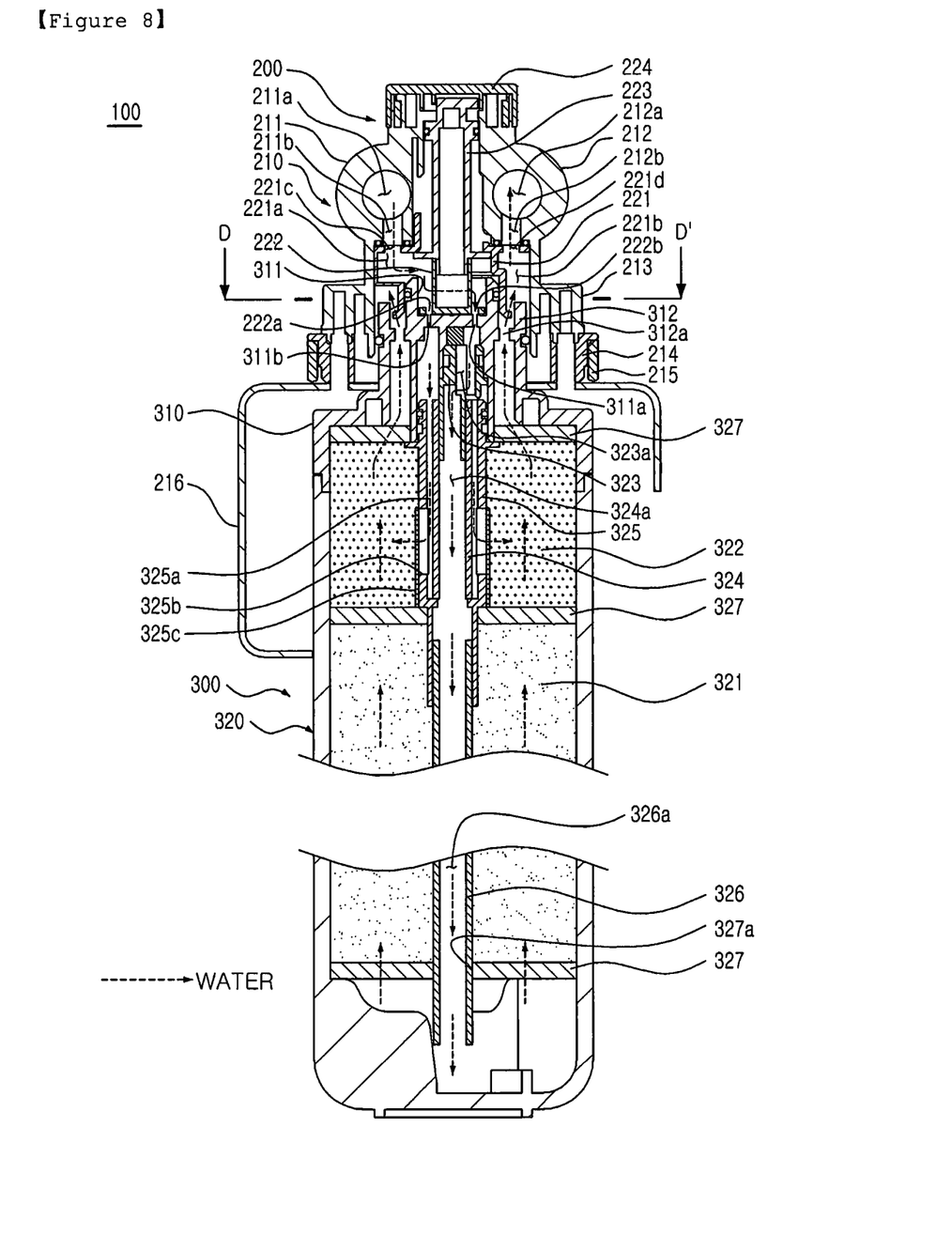
FIG. 8 is a cross-sectional view taken along line A-A' of FIG. 1 illustrating other operation according to an exemplary embodiment in the present disclosure, which illustrates a portion of inflow water passing through the first and second water treatment sections sequentially and the remainder of the water passing through only the second water treatment section.

With reference to FIGS. 4, 6, and 8, water may flow into the inlet portion 211. To this end, an inlet passage 211a may be formed in the inlet portion 211. Also, a side of the inlet portion 211 may be connected to a water supply source (not illustrated) by a connector (not illustrated). Accordingly, as illustrated in FIGS. 4, 6, and 8, water from the water supply source may flow into the inlet portion 211 and may pass through the inlet passage 211a.

According to the exemplary embodiment in the present disclosure as illustrated in FIGS. 1 and 2, a passage closing member C may be provided on the other side of the inlet portion 211 not connected to the connector. Thus, the other side of the inlet portion 211 where water does not flow in may become blocked. On the other hand, a connector connected to the water supply source may also be connected to both one side and the other side of the inlet portion 211 so that water may flow into both the one side and the other side of the inlet portion 211.

The outlet portion 212 may allow water to be discharged externally therethrough as illustrated in FIGS. 4, 6, and 8. To this end, an outflow passage 212a may be formed on the outlet portion 212. Also, one side of the outlet portion 212 may be connected to, for example, a water discharge member (not illustrated) or other water treatment apparatuses (not illustrated) by a connector. Thus, with reference to FIGS. 4, 6, and 8, water treated by the water treatment unit 300 may flow into the outlet portion 212. Further, the treated water may pass through the outflow passage 212a of the outlet portion 212 and be discharged externally through the water discharge member or flow into another water treatment apparatus.

With reference to the exemplary embodiment as illustrated in FIGS. 1 and 2, a passage closing member C may also be provided on the other side of the outlet portion 212 to which the connector is not connected. Thus, the other side of the outflow passage 212a through which water is not discharged may become blocked. However, water may be discharged from both sides of the outlet portion 212.

The connection portion 213 may be connected to the inlet portion 211 and the outlet portion 212. The connection portion 213 may also be connected to the integrated inlet portion 211 and outlet portion 212, but is not limited thereto. For example, any widely used configuration in which the connection portion 213 is connected to the inlet portion 211 and the outlet portion 212 may be used.

The water treatment unit 300 may be connected to the connection portion 213 as illustrated in FIGS. 1 and 4. To this end, a connecting space of the water treatment unit 300 may be formed in the connection portion 213 as illustrated in the exemplary embodiment of FIG. 4. In such a space of the connection portion 213, a connecting passage 211b connected to the inlet passage 211a of the inlet portion 211 and a connecting passage 212b connected to the outflow passage 212a of the outlet portion 212 as described above may be connected.

Thus, as illustrated in FIGS. 4, 6, and 8, water having passed through the inlet passage 211a passes through the connecting passage 211b to the water treatment unit 300, and water treated by the water treatment unit 300 may pass through the connecting passage 212b to flow to the outflow passage 212a.

As illustrated in FIGS. 4, 6, and 8, the flow guide portion 220 may guide the inflow water to flow from the inlet portion 211 to the water treatment unit 300 and guide the water treated by the water treatment unit 300 to flow to the outlet portion 212. To this end, with reference to the exemplary embodiment illustrated in FIGS. 2 and 4, the flow guide portion 220 may include a passage forming member 221 and an opening/closing member 222.

Upper and lower portions of the passage forming member 221 may be open as in the exemplary embodiment illustrated in FIG. 4. In addition, an inflow portion 311, which will be described below, included in the water treatment unit 300 may be connected to the open lower portion of the passage forming member 221. Also, an inflow passage 221a connected to the inlet portion 211 may be formed in the passage forming member 221 with reference to the illustrated exemplary embodiment. According to the exemplary embodiment in the present disclosure, the inflow passage 221a may be connected to the connecting passage 211b connected to the inlet passage 211a of the inlet portion 211 through an inflow connecting aperture 221c.

Thus, water having passed through the inlet passage 211a as illustrated in FIG. 4 may flow into the inflow passage 221a through the inflow connecting aperture 221c. Also, water may flow into the inflow portion 311 of the water treatment unit 300 through the inflow passage 221a.

In addition, with reference to the illustrated exemplary embodiment in FIG. 4, the passage forming member 221 may have an outflow passage 221b formed therein and connected to the outlet portion 212 together with the connection portion 213. Also, the outflow passage 221b may be connected to the connecting passage 212b connected to an outflow passage 212a of the outlet portion 212 through an outflow connecting aperture 221d formed in the passage forming member 221.

Thus, as illustrated in FIG. 4, water discharged from an outflow portion 312, included in the water treatment unit 300 may flow into the outflow passage 212a of the outlet portion 212 through the outflow connecting aperture 221d and the connecting passage 212b after passing through the outflow passage 221b.

Figure 5:
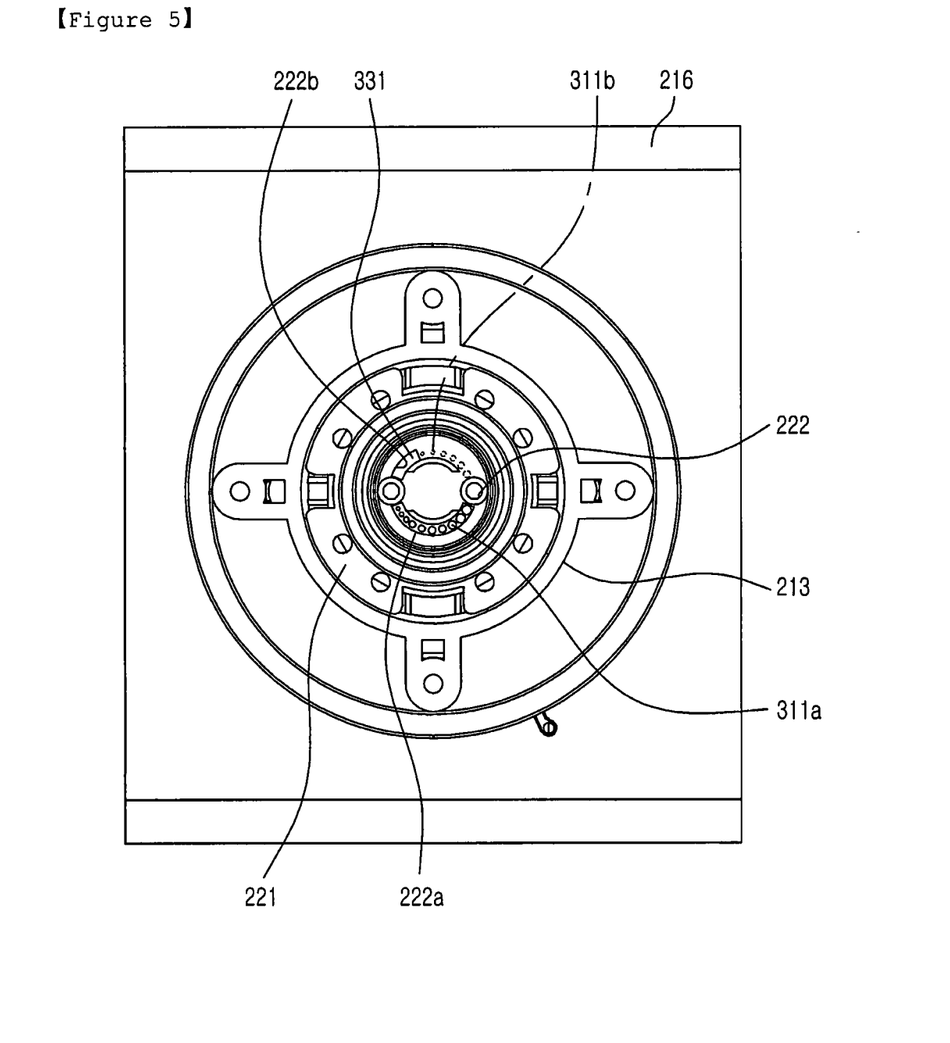
FIG. 5 is a cross-sectional view taken along line B-B' of FIG. 4.
Figure 7:
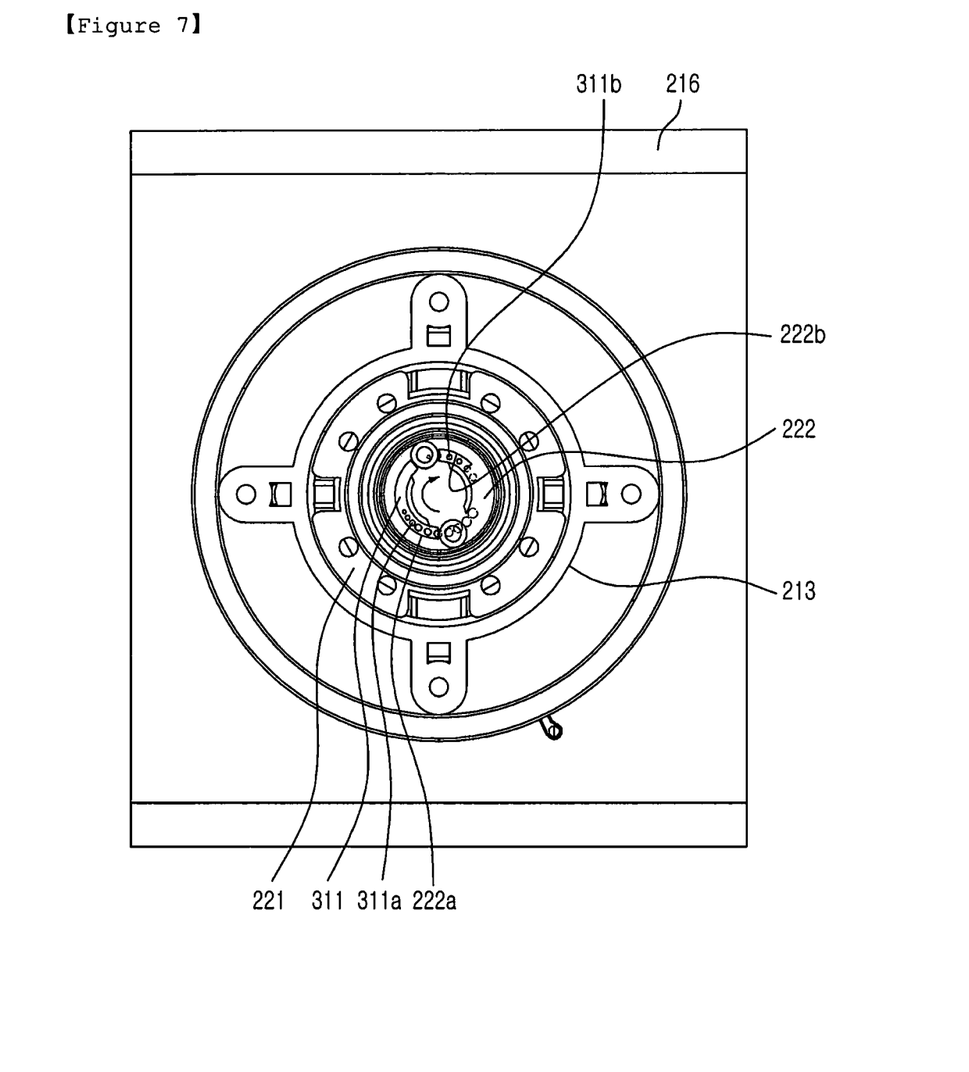
FIG. 7 is a cross-sectional view taken along line C-C' of FIG. 6.
Figure 9:
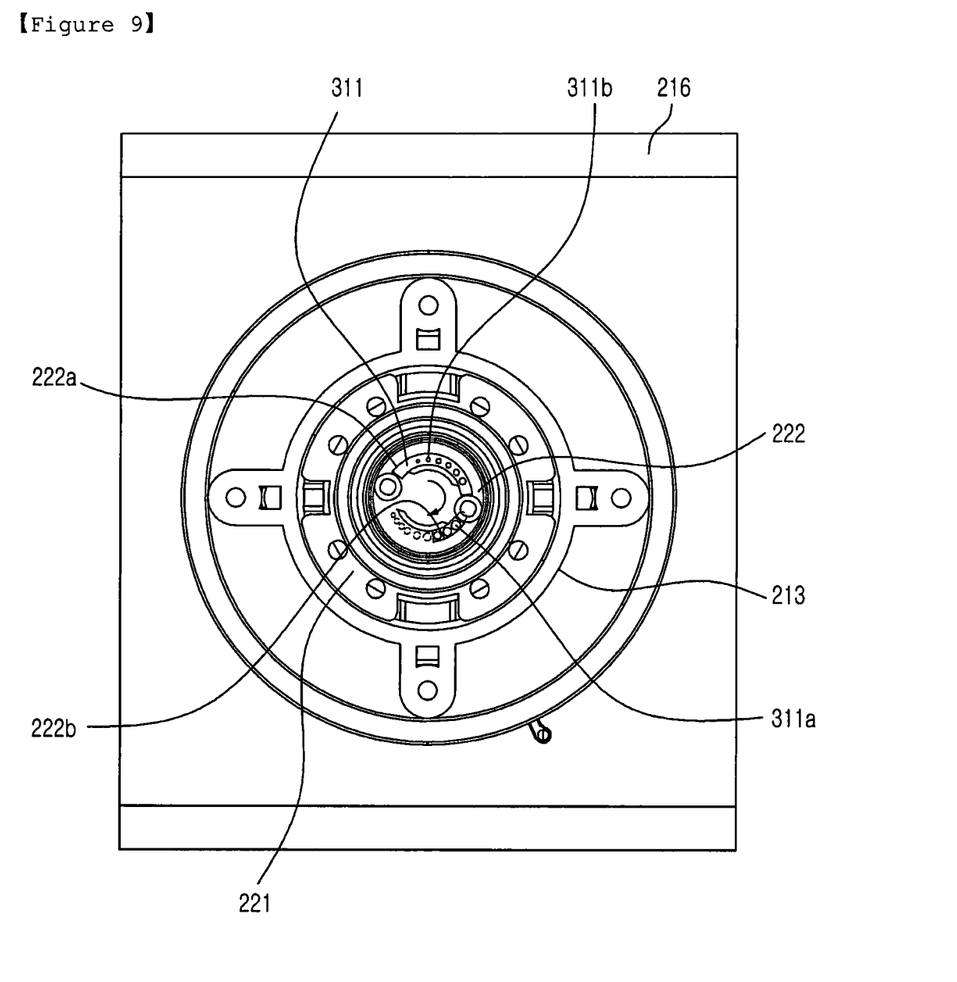
FIG. 9 is a cross-sectional view taken along line D-D' of FIG. 8.

With reference to the exemplary embodiment as illustrated in FIG. 4, the opening/closing member 222 may be rotatably provided in the passage forming member 221. In addition, with reference to the exemplary embodiment as illustrated in FIG. 5, a plurality of opening/closing apertures 222a and 222b may be formed in the opening/closing member 222. Also, as illustrated in FIGS. 5, 7, and 9, a plurality of first inflow apertures 311a formed in the inflow portion 311 or a plurality of second inflow apertures 311b may be opened and closed according to the rotating location. With reference to the exemplary embodiment, the opening/closing member 222 may include two opening/closing apertures 222a and 222b, in detail, a first opening/closing aperture 222a and a second opening/closing aperture 222b.

The plurality of first inflow apertures 311a and the plurality of second inflow apertures 311b may be spaced apart from each other by a predetermined interval with reference to the exemplary embodiment as illustrated in FIGS. 5, 7, and 9. For example, with reference to the illustrated exemplary embodiment, the plurality of first inflow apertures 311a and the plurality of second inflow apertures 311b may form groups of apertures. Also, with reference to the illustrated exemplary embodiment, the plurality of first inflow apertures 311a and the plurality of second inflow apertures 311b may be formed in the circumference of a virtual circle on the inflow portion 311, and diameters thereof may be reduced in a single direction.

In addition, with reference to the exemplary embodiment as illustrated in FIGS. 5, 7, and 9, the plurality of opening/closing apertures 222a and 222b, for example, the first opening/closing aperture 222a and the second opening/closing aperture 222b in the illustrated exemplary embodiment, may have slots with different lengths. Also, with reference to the exemplary embodiment, the apertures may be spaced apart from each other by a predetermined interval. Further, with reference to the exemplary embodiment, the first opening/closing aperture 222a and the second opening/closing aperture 222b may be formed in the opening/closing member 222 in locations corresponding to locations of the plurality of first inflow apertures 311a and the plurality of second inflow apertures 311b formed in the inflow portion 311 of an inlet/outlet member 310 included in the water treatment unit 300 to be described below. For example, the first opening/closing aperture 222a and the second opening/closing aperture 222b may also be formed in the circumference of a virtual circle on the inflow portion 311.

Thus, on a rotating location of the opening/closing member 222 as illustrated in FIG. 5, only the first opening/closing aperture 222a of the opening/closing member 222 may communicate with the plurality of first inflow apertures 311a of the inflow portion 311 as illustrated in FIGS. 4 and 5. Thus, as illustrated, all of the water flowing into the inflow passage 221a of the passage forming member 221 may flow into only the plurality of first inflow apertures 311a through the first opening/closing aperture 222a.

Also, after the water flowing into the plurality of first inflow apertures 311a passes through to the lower portion of the water treatment unit 300 as illustrated in FIG. 4, the water may be treated by passing through the first water treatment section 321 and the second water treatment section 322 sequentially, and then, may be discharged through the outflow portion 312 to flow into the head 200.

Further, on a rotating location of the opening/closing member 222 as illustrated in FIG. 7, the first opening/closing aperture 222a of the opening/closing member 222 may communicate with a portion of the plurality of first inflow apertures 311a of the inflow portion 311 as illustrated in FIGS. 6 and 7, and the second opening/closing aperture 222b may communicate with a portion of the plurality of second inflow apertures 311b of the inflow portion 311. Accordingly, as illustrated, a portion of the water flowing into the inflow passage 221a of the passage forming member 221 may flow into a portion of the plurality of first inflow apertures 311a through the first opening/closing aperture 222a, and the remainder of the water may flow into a portion of the plurality of second inflow apertures 311b through the second opening/closing aperture 222b.

In addition, after the water flowing into a portion of the plurality of first inflow apertures 311a may flow into a lower portion of the water treatment unit 300 as illustrated in FIG. 6, the water is treated by passing through the first water treatment section 321 and the second water treatment section 322 included in the water treatment unit 300 sequentially, and may be discharged through the outflow portion 312.

Also, water flowing into a portion of the plurality of second inflow apertures 311b as illustrated in FIG. 6, is treated by passing through only the second water treatment section 322 included in the water treatment unit 300, and may be discharged through the outflow portion 312.

Also, on a rotating location of the opening/closing member 222 as illustrated in FIG. 9, the first opening/closing aperture 222a of the opening/closing member 222 may communicate with a portion of the plurality of second inflow apertures 311b as illustrated in FIGS. 8 and 9, and the second opening/closing aperture 222b may communicate with a portion of the plurality of first inflow apertures 311a of the inflow portion 311. Thus, as illustrated, a portion of the water flowing into the inflow passage 221a of the passage forming member 221 may flow into a portion of the plurality of second inflow apertures 311b through the first opening/closing aperture 222a, and the remainder of the water may flow into a portion of the plurality of first inflow apertures 311a through the second opening/closing aperture 222a.

Further, water flowing into a portion of the plurality of first inflow apertures 311a may flow into the lower portion of the water treatment unit 300 as illustrated in FIG. 8, and then the water may be treated by passing through the first water treatment section 321 and the second water treatment section 322 included in the water treatment unit 300 sequentially, and may be discharged through the outflow portion 312. Also, water flowing into a portion of the plurality of second inflow apertures 311b as illustrated in FIG. 8, may be treated by passing through only the second water treatment section 322 included in the water treatment unit 300, and may be discharged through the outflow portion 312.

Thus, the water flowing into the inflow passage 221a of the passage forming member 221 may flow into the first inflow aperture 311a or the second inflow aperture 311b of the inflow portion 311 in the water treatment unit 300 by the rotation of the opening/closing member 222, and the flow rate of the water passing through the first inflow aperture 311a or the second inflow aperture 311b may also be adjusted. Therefore, the flow rate of the water treated by passing through a portion of the plurality of water treatment sections 321 and 322, to be described below, of the water treatment unit 300, for example, through the water treatment section 321, may be adjusted.

Accordingly, adequate amounts of functional substances included in the water treatment section 321 may be dissolved in the inflow water, or an adequate amount of positive or negative ions may be relatively increased.

The flow guide portion 220 may further include a connection member 223 and a gripping member 224 with reference to the exemplary embodiment as illustrated in FIGS. 2 and 4. With reference to the exemplary embodiment, the connection portion 223 may be connected to the opening/closing member 222 to block the open upper portion of the passage forming member 221. Also, the gripping member 224 may be connected to the connection member 223. Thus, a user may easily rotate the opening/closing member 222 described above by using the gripping member 224, and thereby, a user may easily adjust the flow rate of the water treated by sequentially passing through both the first and second water treatment sections 321 and 322 of the water treatment unit 300 and the flow rate of the water treated by passing through only the second water treatment section 322.

Further, with reference to the exemplary embodiment in FIG. 2, an elastic member 225 may be provided between the opening/closing member 222 and the connection member 223. Thus, since the elastic force of the elastic member 225 is exerted on the opening/closing member 222 and the connection member 223, connectivity between the opening/closing member 222 and the connection member 223 may be improved. The elastic member 225 may be a coil spring with reference to the exemplary embodiment. However, the elastic member 225 is not limited to being a coil spring, and any elastic member 225 that is commonly used and provides equivalent elasticity may be used.

Additionally, with reference to the exemplary embodiment in FIGS. 2 and 4, an auxiliary connection member 214 may be connected to the connection member 213. The connection of the water treatment unit 300 to the connection member 213 may be supported by such auxiliary connection member 214. Also, a locking release member 215 may be provided in the auxiliary connection member 214 with reference to the exemplary embodiment. The connection of the water treatment unit 300 to the connection portion 213 may be locked or unlocked by the locking release member 215.

To this end, a locking release portion 215a may be provided in locking release member 215 with reference to the exemplary embodiment in FIGS. 2 and 4. Also, when the locking release member 215 is rotated while the water treatment unit 300 being connected to the connection member 213 and the auxiliary connection member 214, the connection of the water treatment unit 300 to the connection member 213 and the auxiliary connection member 214 may be locked or unlocked. Thus, the water treatment unit 300 may be easily connected to or separated from the connection portion 213 and the auxiliary connection member 214.

In addition, a bracket 216 may be connected to the auxiliary connection member 214 with reference to the exemplary embodiment in FIGS. 2 and 4. Thus, a water treatment apparatus 100 according to an exemplary embodiment in the present disclosure may easily be disposed on another apparatus or on a wall or other internal structure.

With reference to the exemplary embodiment in FIGS. 1 and 4, the water treatment unit 300 may be connected to the connection portion 213 of the head unit 210 included in the head 200. Also, with reference to the exemplary embodiment, the water treatment unit 300 may be include a plurality of water treatment sections 321 and 322. Further, as illustrated in FIGS. 4, 6, and 8, a portion of the water flowing into the inlet portion 211 of the head unit 210 provided in connection with the head 200 may pass through the plurality of water treatment sections 321 and 322 sequentially, the remainder of the water may pass through only a portion of the plurality of water treatment sections 321 and 322, and the water together may flow into the outlet portion 212.

Figure 3:
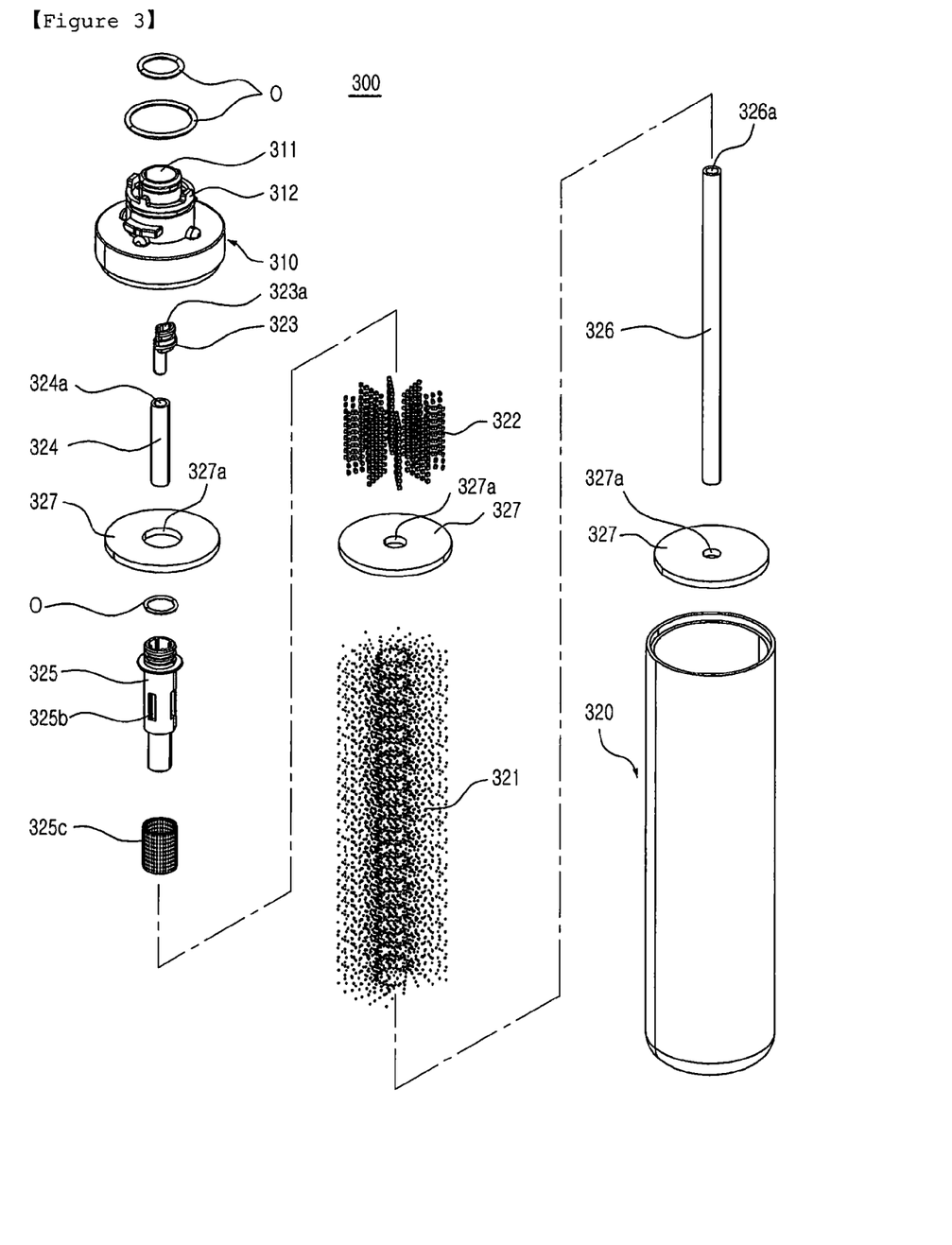
FIG. 3 is an exploded perspective view of a water treatment unit of a water treatment apparatus according to an exemplary embodiment in the present disclosure.

To this end, the water treatment unit 300 may include an inlet/outlet member 310 and a housing 320 with reference to the exemplary embodiment in FIGS. 3 and 4.

Also, with reference to the exemplary embodiment in FIGS. 3 and 4, the inlet/outlet member 310 may include an inflow portion 311 and an outflow portion 312.

Water may flow into the inflow portion 311 from the head 200 with reference to FIGS. 4, 6 and 8. To this end, a plurality of first inflow apertures 311a and a plurality of second inflow apertures 311b may be formed in the inflow portion 311 as previously described and with reference to the exemplary embodiment in FIGS. 4 through 9. Thus, as illustrated in FIGS. 4, 6, and 8, a portion of the water flowing from the head 200 may flow into the water treatment unit 300 through the plurality of first inflow apertures 311a. Also, the remainder of the water may flow into the water treatment unit 300 through the plurality of second inflow apertures 311b.

With reference to FIGS. 4, 6 and 8, water may be discharged to the head 200 through the outflow portion 312. To this end, with reference to the exemplary embodiment in FIGS. 4 through 9, a plurality of outflow apertures 312a may be formed in the outflow portion 312. Thus, as illustrated in FIGS. 4, 6, and 8, water treated by the water treatment unit 300 may be discharged to the head 200 through a plurality of outflow apertures 312a.

The housing 320 may be connected to the inlet/outlet member 310 with reference to the exemplary embodiment in FIGS. 4, 6, and 8. For example, the housing 320 may be fitted to be connected to the inlet/outlet member 310 with reference to the exemplary embodiment. However, the connection of the housing 320 to the inlet/outlet member 310 is not only limited to the description above, but may also be connected by an adhesive, a bolt, a screw, or the lie, and any other common configurations used for the connection to the inlet/outlet member 310 may be applied thereto.

In addition, with reference to the exemplary embodiment in FIGS. 3, 4, 6, and 8, the housing 320 may include a first water treatment section 321 and a second water treatment section 322. With reference to the exemplary embodiment, one or more partitioning members 327 may be provided in the housing 320. With reference to the exemplary embodiment, the first water treatment section 321 and the second water treatment section 322 may be partitioned thereby. Also, the partitioning member 327 may be composed of a material in which water may pass through.

Thus, as illustrated in FIGS. 4, 6, and 8, water may pass through the first and second water treatment portions 321 and 322 without mixing of substances included in the first and second water treatment portions 321 and 322. The partitioning member 327 may be composed of, for example, a non-woven fabric. However, the material composing the partitioning member 327 is not limited to the described material, but may be of any other material in which water may pass through and which may allow for partitioning into the first and second water treatment sections 321 and 322.

With reference to the exemplary embodiment in FIGS. 3, 4, 6, and 8, a through-hole 327a may be formed in the partitioning member 327. The through-hole 327a of the partitioning member 327 with reference to the illustrated exemplary embodiment may be penetrated by the inflow portion 311 of the inlet/outlet member 310 or a third guide member 325 or a fourth guide member 326 which will be described below. Thus, water flowing from the plurality of first inflow apertures 311a formed in the inflow portion 311 of the inlet/outlet member 310 may flow into the lower portion of the housing 320 through a first passage 323a of a first guide member 323, a second passage 324a of a second guide member 324, and a third passage 326a of the fourth guide member 326 as described below.

The first water treatment section 321 may include functional substances such as phosphate to remove pipeline scale. Thus, functional substances such a phosphate may be dissolved in the water having passed through the first water treatment section 321. Also, the first water treatment section 321 may include an ion-exchange resin. Thus, a relatively high amount of positive or negative ions may be included in the water having passed through the first water treatment section 321 according to the type of ion-exchange resin. Further, the second water treatment section 322 may include carbon particles. Thus, water having passed through the second water treatment section 322 may be treated by carbon particles absorbing and removing various impurities including microorganisms from the water.

In addition, as illustrated in FIGS. 4, 6, and 8, a portion of the water flowing into the inflow portion 311, for example, water having passed through a plurality of first inflow apertures 311a of the inflow portion 311, may be treated by passing through the first and second water treatment sections 321 and 322 sequentially. Also, the remainder of the water, for example, water having passed through the plurality of second inflow apertures 311b of the inflow portion 311 as illustrated, may be treated by passing through only the second water treatment section 322, and then, the water together may be discharged through the outflow portion 312.

Accordingly, as described above, when the first water treatment section 321 includes functional substances or an ion-exchange resin and the second water treatment section 322 includes carbon particles, a portion of the water having passed through the plurality of first inflow apertures 311a of the inflow portion 311 may pass through the first water treatment section 321 and may be in a state in which functional substances are dissolved or a relatively high amount of positive or negative ions are contained therein, and further, may pass through the second water treatment section 322 sequentially, so that microorganisms as well as various impurities may be removed. Also, water having passed through the plurality of second inflow apertures 311b of the inflow portion 311 may pass through only the second water treatment section 322 to remove various impurities, including microorganisms. Further, water treated by passing through both the first and second water treatment sections 321 and 322 or water treated by passing through only the second treatment portion 322 in such ways, may be discharged together to the head 200 through the outflow aperture 312a of the outflow portion 312.

Thus, as described above, amounts of functional substances dissolved in water and the amount of positive or negative ions included in water may be adjusted by adjusting the flow rate of the water passing through the plurality of first inflow apertures 311a and the plurality of second inflow apertures 311b of the inflow portion 311, to thus remove various impurities, including microorganisms.

Also, the second water treatment section 322 may be located above the first water treatment section 321 with reference to the exemplary embodiment illustrated in FIGS. 3, 4, 6, and 8. Further, as illustrated in FIGS. 4, 6, and 8, a portion of the water flowing from the inflow portion 311, for example, water passing through the plurality of first inflow apertures 311a of the inflow portion 311, may flow to the lower portion of the housing 320, and then, may pass through the first and second water treatment sections 321 and 322 sequentially. In addition, as illustrated, the remainder of the water, for example, water having passed through the plurality of second inflow apertures 311b of the inflow portion 311, may only pass through the second water treatment section 322.

To this end, with reference to the exemplary embodiment illustrated in FIGS. 3, 4, 6, and 8, the housing 320 may further include a first guide member 323, a second guide member 324, and a third guide member 325.

With reference to the exemplary embodiment illustrated in FIGS. 3, 4, 6, and 8, a first passage 323a may be formed in the first guide member 323. The first guide member 323 may be connected to the inflow portion 311 of the inlet/outlet member 310 with reference to the exemplary embodiment illustrated in FIGS. 4, 6, and 8, and the first passage 323a of the first guide member 323 may thereby be connected to the plurality of first inflow apertures 311a. Accordingly, as illustrated, water having passed through the plurality of first inflow apertures 311a of the inflow portion 311 may flow into the first passage 323a of the first guide member 323.

With reference to the exemplary embodiment illustrated in FIGS. 3, 4, 6, and 8, a second passage 324a may be formed in the second guide member 324. Also, the first guide member 323 may be connected to the second guide member 324, and thereby, the second passage 324a of the second guide member 324 may be connected to the first passage 323a of the first guide member 323. Accordingly, as illustrated, water having passed through the first passage 323a of the first guide member 323 may flow into the second passage 324a of the second guide member 324 and may thus flow into a lower portion of the housing 200.

The second guide member 324 may be inserted into the third guide member 325 with reference to the illustrated exemplary embodiment in FIGS. 4, 6, and 8. Accordingly, a bypass passage 325a connected to the plurality of second inflow apertures 311b and the second water treatment section 322 may be formed between the third guide member 325 and the second guide member 324. With reference to the illustrated exemplary embodiment, the bypass passage 325a may be connected to the second water treatment section 322 by a bypass aperture 325b formed in the third guide member 325. Accordingly, water having passed through the plurality of second inflow apertures 311b may flow into the second water treatment section 322.

In addition, with reference to the illustrated exemplary embodiment, a filtering member 325c in which a plurality of apertures are formed may be provided in the bypass aperture 325b of the third guide member 325. Thus, as described above, in a case in which carbon particles are included in the second water treatment section 322, carbon particles of the second water treatment section 322 may be prevented from flowing into the bypass passage 325a through the bypass aperture 325b.

Also, with reference to the exemplary embodiment illustrated in FIGS. 3, 4, 6, and 8, the housing 320 may further include a fourth guide member 326. With reference to the illustrated exemplary embodiment, the third passage 326a may be formed in the fourth guide member 326. Further, the fourth guide member 326 may be connected to the third guide member 325, and thereby, the second passage 324a of the second guide member 324 may be connected to the third passage 326a of the fourth guide member 326. Accordingly, as illustrated, water having passed through the second passage 324a of the second guide member 324 may flow into the third passage 326a of the fourth guide member 326 to flow in the third passage 326a, and may flow into the lower portion of the housing 320.

Further, water flowing to the lower portion of the housing 320 in such a way may flow into the upper portion of the housing 320 as illustrated in FIGS. 4, 6, and 8, and may flow into the head 200 through the outflow aperture 312a formed in the outflow portion 312 of the inlet/outlet member 310, after being treated by passing through the first water treatment section 321 and the second water treatment section 322 sequentially.

Additionally, the non-described reference numeral "O" indicates sealing members such as an o-ring.

As set forth above, when using the water treatment apparatus according to an exemplary embodiment in the present disclosure, a plurality of water treatment sections which treat inflow water may be included; a portion of the water is treated by passing through a plurality of water treatment sections sequentially, the remainder of the water is treated by passing through only a portion of the plurality of water treatment sections, and the water together may be discharged externally; the flow rate of water passing through a portion of the water treatment sections may be adjusted, adequate amounts of functional substances may be dissolved, or an adequate amount of positive or negative ions may be relatively increased in the inflow water.

While exemplary embodiments have been shown and described above, it will be apparent to those skilled in the art that modifications and variations could be made without departing from the scope of the invention as defined by the appended claims.

The invention claimed is:

1. A water treatment apparatus comprising:
   a head (200) including an inlet portion (211) into which water flows, an outlet portion (212) from which water is discharged externally, and a connection portion (213) connected to the inlet portion (211) and the outlet portion (212); and
   a water treatment unit (300) including first and second water treatment sections (321, 322) coupled to the head (200), and configured such that a portion of the water flowing into the inlet portion (211) passes through the first and second water treatment sections (321, 322) sequentially, the remainder of the water passes through only a portion of the first and second water treatment sections (321, 322), and the water flows to the outlet portion (212) together,
   wherein the head (200) comprises:
      a head body (210) including the inlet portion (211), the outlet portion (212), and the connection portion (213); and
      a flow guide portion (220) guiding the water flowing into the inlet portion (211) to flow into the water treatment unit (300), and guiding the water treated by the water treatment unit (300) to flow into the outlet portion (212), and
   wherein the flow guide portion (220) includes:
      a passage forming member (221) including an inflow passage (221a) having an open lower portion connected to an inflow portion (311) included in the water treatment unit (300) and connected to the inlet portion (211), and an outflow passage (221b) connected to the outlet portion (212) and the connection portion (213); and
      an opening/closing member (222) rotatably provided on the passage forming member (221) and including a plurality of opening/closing apertures (222a, 222b) formed therein to open or close a plurality of first inflow apertures (311a) or a plurality of second inflow apertures (311b) formed in the inflow portion (311) according to a rotating location of the opening/closing member (222).

2. The water treatment apparatus of claim 1, wherein the plurality of first inflow apertures (311a) and the plurality of second inflow apertures (311b) are spaced apart from each other by a predetermined interval, are formed in a circumference of a virtual circle on the inflow portion (311), and have diameters of which the sizes are decreased in a single direction; and
   the plurality of opening/closing apertures (222a, 222b) have slots with different lengths, are spaced apart from each other by a predetermined interval and are formed in the opening/closing member (222) in locations corresponding to locations of the plurality of first inflow apertures (311a) and the plurality of second inflow apertures (311b).

3. The water treatment apparatus of claim 1 wherein the flow guide portion (220) further comprises:

a connection member (223) connected to the opening/closing member (222) to block an open upper portion of the passage forming member (221); and
   a gripping member (224) connected to the connection member (223).

4. The water treatment apparatus of claim 3, wherein the opening/closing member (222) and the connection member (223) have an elastic member (225) provided therebetween.

5. The water treatment apparatus of claim 1, wherein the water treatment unit (300) includes:
   an inlet/outlet member (310) having the inflow portion (311) into which water flows from the head (200) and an outflow portion (312) through which water is discharged to the head (200); and
   a housing (320) connected to the inlet/outlet member (310), including the first water treatment section (321) and the second water treatment section (322), and configured such that a portion of the water flowing into the inflow portion (311) passes through the first and second water treatment sections (321, 322) sequentially, the remainder of the water passes through only the second water treatment section (322), and the water flows together to the outflow portion (312).

6. The water treatment apparatus of claim 5, wherein the second water treatment section (322) is located above the first water treatment section (321); and a portion of the water flowing into the inflow portion (311) flows into a lower portion of the housing (320) and then passes through the first and second water treatment sections (321, 322) sequentially, and the remainder of the water passes through only the second water treatment section (322).

7. The water treatment apparatus of claim 6, wherein the first water treatment section (321) includes a functional substance or an ion-exchange resin, and the second water treatment section (322) includes carbon particles.

8. The water treatment apparatus of claim 6, wherein the inflow portion (311) includes a plurality of first inflow apertures (311a) and a plurality of second inflow apertures (311b), and the outflow portion (312) includes a plurality of outflow apertures (312a).

9. The water treatment apparatus of claim 8, wherein the housing (320) further comprises:
   a first guide member (323) including a first passage (323a) connected to the plurality of first inflow apertures (311a) so that water passing through the plurality of first inflow apertures (311a) flows into the first passage (323a);
   a second guide member (324) including a second passage (324a) connected to the first passage (323a) so that water passing through the first passage (323a) flows into a lower portion; and
   a third guide member (325) into which the second guide member (324) is inserted so that a bypass passage (325a) is formed therebetween, the bypass passage (325a) being connected to the second water treatment section (322) and the plurality of second inflow apertures (311b) so that water passing through the plurality of the second inflow apertures (311b) flows into the second water treatment section (322).

10. The water treatment apparatus of claim 9, wherein the housing (320) further comprises a fourth guide member (326) including a third passage (326a) connected to the second passage (324a) so that water passing through the second passage (324a) flows into the lower portion.

11. The water treatment apparatus of claim 5, wherein the housing includes one or more partitioning members (327)

formed of a water permeable material partitioning the first and second water treatment sections (321, 322).

12. The water treatment apparatus of claim 11, wherein the partitioning members (327) are formed of non-woven fabric.

* * * * *